United States Patent
An et al.

(10) Patent No.: US 9,732,447 B2
(45) Date of Patent: Aug. 15, 2017

(54) METHOD OF PREPARING POLYESTER FIBER FOR SEAT BELT

(71) Applicant: KOLON INDUSTRIES, INC., Gwacheon-si, Gyeonggi-do (KR)

(72) Inventors: Byoung-Wook An, Incheon-si (KR); Gi-Woong Kim, Daegu-si (KR); Seong-Young Kim, Gumi-si (KR); Young-Soo Lee, Gumi-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 135 days.

(21) Appl. No.: 14/410,771

(22) PCT Filed: Jun. 28, 2013

(86) PCT No.: PCT/KR2013/005770
§ 371 (c)(1),
(2) Date: Dec. 23, 2014

(87) PCT Pub. No.: WO2014/003487
PCT Pub. Date: Jan. 3, 2014

(65) Prior Publication Data
US 2015/0145314 A1 May 28, 2015

(30) Foreign Application Priority Data

Jun. 28, 2012 (KR) .................. 10-2012-0070203
Sep. 28, 2012 (KR) .................. 10-2012-0109468
Dec. 27, 2012 (KR) .................. 10-2012-0154104

(51) Int. Cl.
*D01D 10/02* (2006.01)
*D02J 1/22* (2006.01)
(Continued)

(52) U.S. Cl.
CPC ......... *D03D 1/0005* (2013.01); *B29C 55/005* (2013.01); *B60R 22/12* (2013.01);
(Continued)

(58) Field of Classification Search
CPC .. D01D 5/08; D01D 5/12; D01D 5/16; D01D 10/02; D02J 1/22; D02J 1/228
(Continued)

(56) References Cited

U.S. PATENT DOCUMENTS 3,966,867 A * 6/1976 Munting ................... D01F 6/62
264/210.7
5,997,789 A * 12/1999 Okumura ................. D01D 5/08
264/169
2013/0090032 A1* 4/2013 Kim ........................ D01D 5/16
264/210.8 X

FOREIGN PATENT DOCUMENTS

CN 1286663 A 3/2001
CN 1373250 A 10/2002
(Continued)

OTHER PUBLICATIONS

European Patent Office; Communication dated Dec. 9, 2015 in counterpart application No. 13808636.8.
(Continued)

*Primary Examiner* — Leo B Tentoni
(74) *Attorney, Agent, or Firm* — Sughrue Mion, PLLC

(57) ABSTRACT

Disclosed is a high strength polyester fiber for a seat belt, and in particular, a polyester fiber for a seat belt, which has intrinsic viscosity of 0.8 to 1.5 dl/g, tensile strength of 8.8 g/d or more, and total fineness of 400 to 1800 denier. A method of preparing the fiber is disclosed. The polyester fiber includes filaments having high strength, low modulus, and high elongation to significantly lower shrinkage, while securing excellent mechanical properties, it is possible to manufacture a seat belt having excellent impact absorption
(Continued)

and significantly improved abrasion resistance and heat resistant strength retention, even with a woven density of 260 yarns/inch or less.

2 Claims, 2 Drawing Sheets

(51) Int. Cl.
*D03D 1/00* (2006.01)
*B60R 22/12* (2006.01)
*D01F 6/62* (2006.01)
*D01D 5/08* (2006.01)
*B29C 55/00* (2006.01)
*D02G 3/04* (2006.01)
*D02G 3/44* (2006.01)
*D01D 5/16* (2006.01)
*B29K 33/04* (2006.01)
*B29L 31/00* (2006.01)

(52) U.S. Cl.
CPC .............. *D01D 5/08* (2013.01); *D01F 6/62* (2013.01); *D02G 3/045* (2013.01); *D02G 3/446* (2013.01); *D02J 1/228* (2013.01); *B29K 2033/04* (2013.01); *B29L 2031/731* (2013.01); *D01D 5/16* (2013.01); *D10B 2331/04* (2013.01); *D10B 2505/122* (2013.01); *Y10T 428/298* (2015.01)

(58) Field of Classification Search
USPC .... 264/210.7, 210.8, 211.14, 211.15, 211.17
See application file for complete search history.

(56) References Cited

FOREIGN PATENT DOCUMENTS

| | | |
|---|---|---|
| CN | 1427104 A | 7/2003 |
| JP | 6-128810 A | 5/1994 |
| JP | 11-350249 A | 12/1999 |
| KR | 10-0687033 B1 | 2/2007 |
| KR | 10-0996845 B1 | 11/2010 |
| KR | 10-2012-0002498 A | 1/2012 |
| KR | WO 2012002749 A2 * | 1/2012 ............... D01D 5/16 |

OTHER PUBLICATIONS

International Searching Authority, International Search Report for PCT/KR2013/005770 dated Sep. 24, 2013 [PCT/ISA/210].

* cited by examiner

METHOD OF PREPARING POLYESTER FIBER FOR SEAT BELT

CROSS REFERENCE TO RELATED APPLICATIONS

This application is a National Stage of International Application No. PCT/KR2013/005770, filed on Jun. 28, 2013, which claims priority from Korean Patent Application Nos. 10-2012-0070203, filed on Jun. 28, 2012, 10-2012-0109468, filed on Sep. 28, 2012, and 10-2012-0154104, filed on Dec. 27, 2012, the contents of all of which are incorporated herein by reference in their entirety.

TECHNICAL FIELD

The present invention relates to industrial high strength polyester fiber used for a seat belt and the like, and a method of preparing the same. More particularly, the present invention relates to high strength polyester fiber for a seat belt having excellent mechanical properties and abrasion resistance, heat resistant strength retention, impact absorption, and the like, and a method of preparing the same.

BACKGROUND

Polyester represented by polyethylene terephthalate (hereinafter referred to as "PET") is widely used for fiber, a film, a resin, and the like due to its excellent mechanical strength, chemical resistance, and the like. For example, the fiber is widely used for industrial materials, for example, as a rubber reinforcement material such as a tire cord, a belt, a hose, and the like, as well as for medical applications.

Currently, among the polyester fiber for industrial materials, high strength polyester fiber including polyethylene terephthalate as a main component is widely used as a yarn for a seat belt. The yarn for a seat belt should, of course, maintain high strength, and it should also have good sliding efficiency after being manufactured into a seat belt so as to sharply decrease repeated friction with a sash guide, and friction generated when taking out and housing the seat belt for attachment and detachment.

As such, in order to impart sufficient sliding efficiency to polyester fiber for a seat belt, in general, an emulsion containing a lubricant is provided when preparing the polyester fiber. However, since polyester fiber for a seat belt is generally not colored, a dyeing process is required after weaving, and the lubricant-containing emulsion provided in the yarn preparing process may be eliminated during the dyeing process. For this reason, it is difficult to impart sufficient lubricity to polyester fiber for a seat belt by only providing a lubricant during a preparation process.

Further, in general, if conventional polyester fiber for a seat belt is subjected to processes of manufacturing a webbing product using yarn and dyeing it, the strength may be lowered due to high temperature heat treatment, and thus technology has been developed only toward increasing strength with high-strength yarn. Since yarn for a seat belt basically serves to fix a passenger to a car body upon a car accident, thereby reducing secondary damage, for the most important passenger protection it is very important to maintain strength of the yarn. However, if polyester fiber with a high modulus and low elongation at break is used for yarn for a seat belt, sliding efficiency for reducing friction generated when the seat belt is mounted in a vehicle and used may be significantly lowered, and it may cause injury to a passenger upon a car crash due to stiffness of the seat belt itself.

Accordingly, it is required to develop industrial high-strength polyester fiber used for a seat belt and the like which maintains excellent mechanical properties and high strength, and has significantly improved softness, abrasion resistance, strength retention, and the like to reduce impact on a passenger.

SUMMARY OF INVENTION

It is an object of the present invention to provide polyester fiber that exhibits high strength, a low modulus, and high elongation so as to be usable for a seat belt, webbing, and the like, and has excellent mechanical properties, abrasion resistance, and strength retention, so that secondary damage due to stiffness of a seat belt itself upon an accident is minimized.

It is another object of the present invention to provide a method of preparing the polyester fiber.

It is another object of the present invention to provide a seat belt including the polyester fiber.

DETAILED DESCRIPTION OF THE EMBODIMENT

The present invention provides polyester fiber for a seat belt having intrinsic viscosity of 0.8 to 1.5 dl/g, tensile strength of 8.8 g/d or more, and total fineness of 400 to 1800 denier.

The present invention also provides a method of preparing the polyester fiber for a seat belt, including melt spinning a polyester polymer having intrinsic viscosity of 0.8 dl/g or more at 270 to 310° C. to prepare undrawn polyester yarn, and drawing the undrawn polyester yarn.

The present invention also provides a seat belt including the polyester fiber.

Hereinafter, polyester fiber for a seat belt, a method of preparing the same, and a seat belt produced by applying the polyester fiber according to specific exemplary embodiments of the present invention will be described. However, this is presented as an illustration of the present invention, and does not limit the scope of protection of the invention. It is obvious to a person skilled in the art that various modifications of an exemplary embodiment are possible within the scope of protection of the invention.

Additionally, unless specifically indicated herein, "comprise", "include", and "contain" refer to including any constitutional element (or constitutional ingredient) without specific limitations, and it should not be interpreted as excluding the addition of other constitutional elements (or constitutional ingredients).

In general, as yarn for a seat belt, high strength polyester fiber including polyethylene terephthalate (hereinafter referred to as "PET") as a main component is widely used. Further, the yarn for a seat belt should, of course, maintain high strength, and should also have good sliding efficiency so as to remarkably decrease repeated friction during attachment/detachment when it is mounted in a vehicle and used.

Since the seat belt should serve to fix a passenger to a car body during a car accident, thereby reducing secondary damage, for passenger protection, it is designed with high-strength yarn, and thus polyester fiber with a high modulus and low elongation at break is mainly used. Particularly, polyester has higher stiffness compared to nylon and the like, due to its molecular structure, and thus has a high modulus property.

However, if the conventional high modulus polyester fiber with high stiffness is used to manufacture a seat belt, it may cause injury to the passenger due to the excessive stiffness of the seat belt upon a car crash.

Accordingly, the polyester fiber of the present invention may be effectively applied to manufacture of a seat belt having an excellent impact absorption rate, and significantly improved abrasion resistance and heat resistant strength retention while maintaining high strength.

As a result of experiments of the present inventors, it was found that when polyester fiber having specific properties is used to manufacture a seat belt and the like, more improved sliding property and impact absorption rate, and the like, may be secured together with excellent mechanical properties.

Thus, according to one exemplary embodiment of the invention, polyester fiber for a seat belt having predetermined properties is provided. The polyester fiber for a seat belt may have intrinsic viscosity of 0.8 to 1.5 dl/g, tensile strength of 8.8 g/d or more, and total fineness of 400 to 1800 denier.

Particularly, it is possible for the present invention to be designed to have a low number of woven yarns of 280 yarns/inch or less, upon manufacturing a seat belt, by optimizing intrinsic viscosity, tensile strength, and total fineness of yarn. Also, the present invention may acquire the polyester fiber having high strength, a low modulus, and high elongation properties. The polyester fiber of the present invention may be effectively manufactured into a seat belt, which minimizes secondary damage caused by stiffness of the seat belt itself upon an accident after being mounted in a vehicle, and has excellent mechanical properties, softness, abrasion resistance, and strength retention.

It is preferred that the polyester fiber of the present invention includes polyethylene terephthalate (PET) as a main component. During the preparation process of PET, various additives may be added, and in order to secure excellent mechanical properties upon being manufactured into a seat belt, the PET may be included at at least of 70 mol % or more, more preferably 90 mol % or more. Hereinafter, the term polyethylene terephthalate (PET) refers to the case where a polyethylene terephthalate (PET) polymer is included at 70 mol % or more, without any special explanation.

The polyester fiber according to one exemplary embodiment of the invention is prepared under the condition of melt spinning and drawing as described below, thereby representing optimized characteristics of intrinsic viscosity of 0.8 to 1.5 dl/g, tensile strength of 8.8 g/d or more, and total fineness of 400 to 1800 denier.

The polyester fiber for a seat belt of the present invention may have improved intrinsic viscosity as compared with previously known polyester fiber, that is, 0.8 dl/g to 1.5 dl/g, preferably 0.9 dl/g to 1.4 dl/g. It is preferred that the intrinsic viscosity is secured in the above range so as to exhibit sufficient toughness when the polyester fiber is used to manufacture a seat belt. Particularly, it is preferred that the intrinsic viscosity of the yarn is 0.8 dl/g or more since the fiber may exhibit high strength at a low draw ratio to satisfy the strength required as a seat belt. On the contrary, if the intrinsic viscosity is less than 0.8 dl/g, the properties would be exhibited only at a high draw ratio. Then, if the high draw ratio is applied, an orientation degree of fiber may be increased to obtain a high modulus property. Thus, it is preferred to maintain the intrinsic viscosity of the yarn at 0.8 dl/g or more to apply a low draw ratio so as to exhibit a low modulus. Further, if the intrinsic viscosity of the polyester fiber is greater than 1.5 dl/g, draw tension may be increased during a drawing process to generate problems in the process, and thus the intrinsic viscosity of 1.5 dl/g or less would be more preferred.

Further, the polyester fiber may have tensile strength of 8.8 g/d or more, or 8.8 g/d to 15.0 g/d, preferably 9.5 g/d or more, more preferably 10.0 g/d or more. The polyester fiber may have tensile strength of 8.8 g/d or more, in terms of securing superior strength so that the seat belt manufactured from the fiber may effectively support a passenger. Further, the polyester fiber may have elongation of 10% to 17%, preferably 11% to 16%, more preferably 12% to 15%. The polyester fiber may have elongation of 10% or more, in terms of minimizing discomfort of a passenger and a secondary injury to a passenger, which is caused by excessive stiffness of a finally manufactured seat belt. Further, the elongation may be 17% or less, in terms of the seat belt manufactured using the polyester fiber maintaining a sufficient recoil distance for protecting a passenger and safely supports the passenger.

The polyester fiber of the present invention may secure a high strength property for supporting a passenger with sufficient strength upon a car crash, and may be further given a more improved impact absorption property with a low draw ratio under the condition of melt spinning and drawing as described below, by maintaining such high intrinsic viscosity and tensile strength.

Further, since in order to be effectively used for a seat belt or a webbing product, the polyester fiber should maintain low fineness and high strength in terms of the thickness of a seat belt and module mounting, yarn may have applicable total fineness of 400 to 1800 denier, preferably 500 to 1700 denier. The total fineness of the fiber may be 400 denier or more, in terms of securing sufficient high strength physical properties upon manufacturing a seat belt, and 1800 denier or less, in terms of minimizing woven density to secure superior thickness and thus improve fabric softness. It is possible for the polyester fiber for manufacturing a seat belt to be designed to have a low number of woven yarns of 280 yarns/inch or less by optimizing the total fineness and the like, and acquire high strength, a low modulus, and a high elongation property of yarn. Such polyester fiber may be effectively manufactured into a seat belt which minimizes secondary damage caused by stiffness of the seat belt itself upon an accident after being mounted in a vehicle, and it has excellent mechanical properties, softness, abrasion resistance, and strength retention.

Also, the polyester fiber may have single fineness of 8.0 DPF or more, or 8.0 to 20 DPF, preferably 8.5 DPF or more, or 8.5 to 18 DPF. The single fineness of the fiber may be 8.0 DPF or more, in terms of securing a sufficient high strength physical property to prevent an injury to a passenger upon a car crash after being manufactured into a seat belt and mounted in a vehicle, and optimizing the number of woven yarns. Further, though the yarn may have a softer feel as the number of filaments is increased, too large a number of filaments may cause a poor spinning property, and thus the number of filaments may be 50 to 240, preferably 55 to 220.

Accordingly, it is possible to manufacture a seat belt or a webbing product having all of significantly improved and excellent mechanical properties, abrasion resistance, heat resistance strength retention, and an impact absorption, by using polyester fiber maintaining intrinsic viscosity, tensile strength, and total fineness of yarn in an optimized range, at the same time.

The polyester fiber may represent dry heat shrinkage of 13% or less, preferably 9% to 13%. The dry heat shrinkage is based on a measured value under the condition of adding a static load at 150° C. for 30 minutes.

Further, the polyester fiber may have a characteristic of being stretched by elongation of 0.4% or more at stress of polyester yarn of 1.0 g/d, elongation of 3.5% or more at stress of 4.0 g/d, and elongation of 6.0% or more at stress of 7.0 g/d, as measured at room temperature. Conventional polyester generally has a molecular structure with high stiffness, which results in a high modulus property, and significantly deteriorated impact absorption performance and sliding property when being manufactured into a seat belt. However, the polyester fiber obtained through controlled melt spinning and drawing process represents high strength and a low modulus, and initial modulus that is lower than previously known industrial polyester yarn. Particularly, the polyester fiber may represent an initial modulus of 35 to 105 g/d, preferably 45 to 105 g/d, more preferably 60 to 100 g/d. Further, the polyester fiber of the present invention has a characteristic of minimized drawing together with such a low initial modulus. The polyester fiber may solve the problems of low abrasion resistance, impact absorption performance degradation, and the like in a seat belt including the conventional fiber with a high modulus and low elongation at break, and may represent more improved abrasion resistance, strength retention, and the like together with excellent mechanical properties.

The polyester fiber may have a modulus (Young's modulus) as measured by the American Society for Testing and Materials (ASTM) D 885 method of 65 to 105 g/de, preferably 70 to 100 g/de, at elongation of 1%, that is, at a point of being stretched by 1%. Compared with the polyester fiber as a conventional general industrial yarn, having a modulus (Young's modulus) of 100 g/de or more at a point of being stretched by 1%, and 80 g/de or more at a point of being stretched by 2%, the polyester fiber of the present invention has a significantly low modulus.

The modulus of the polyester fiber, which is a physical property value of a modulus of elasticity obtained from the slope of an elastic region of a stress-strain curve obtained from a tensile test, corresponds to an elastic modulus representing the degree of stretching and strain of an object when the object is lengthened at both sides. If the fiber has too high a modulus, it has good elasticity but is vulnerable to fatigue. That is, the fiber has degraded physical properties generated when used for a long time. Additionally, the fiber may have excessive stiffness so that damage by a seat belt itself may be generated upon an accident. On the contrary, if the fiber has too low a modulus, the seat belt may not serve to hold a passenger upon an accident so that secondary damage of being hit inside of a car may be generated.

As such, a seat belt manufactured from the polyester fiber having an initial modulus in a low range as compared with the conventional fiber may minimize secondary damage caused by the stiffness of the seat belt itself upon an accident which occurs with the conventional seat belt, and also minimize a physical property degradation phenomenon due to long-term use.

Particularly, the polyester fiber of the present invention may solve the problems such as failing to hold a passenger upon an accident as it does not satisfy an optimal physical property range to be required upon application due to long-term use, as described above, and may represent more improved abrasion resistance, strength retention, and the like together with excellent mechanical properties.

Accordingly, it is possible to manufacture a seat belt or a webbing product representing excellent mechanical properties, and abrasion resistance, heat resistant strength retention, and an impact absorption effect at the same time, using the polyester fiber having a low initial modulus and high elongation, and preferably high intrinsic viscosity.

Consequently, through the polyester fiber, excellent mechanical properties and strength retention may be secured by significantly lowering thermal strain and strength decrease in the manufacturing process of a seat belt, and at the same time, the impact on a passenger by a seat belt itself upon a car crash may be minimized, thereby safely protecting the passenger.

As described above, by securing intrinsic viscosity, tensile strength, total fineness, and the like, and further, an initial modulus, elongation, and the like in an optimal range, the polyester fiber of the present invention may secure a high degree of strength and physical properties, and also exhibit excellent performance in abrasion resistance, strength retention, and the like in the manufacture of the seat belt.

Further, the polyester fiber may have crystallinity of 40% to 55%, preferably 42% to 50%, more preferably 44% to 48%, so as to prevent strain during heat treatment such as coating. The crystallinity of the yarn may be 40% or more, so as to maintain thermal shape stability and the like when applied to a fabric for a seat belt. If it is greater than 55%, a non-crystalline region may be decreased to lower impact absorption performance, and thus 55% or less is preferred.

In addition, the polyester fiber may further include an additive, so as to prevent yarn damage while spinning, improve frictional resistance of yarn, and minimize a strength decrease. Particularly, the polyester fiber may include one or more inorganic additives selected from the group consisting of $TiO_2$, $SiO_2$, $BaSO_4$, and the like. The inorganic additive may be included in a content of 100 to 1200 ppm, preferably 200 to 1000 ppm, based on the polyester fiber. It is preferred that the inorganic additive is included at 100 ppm or more, preferably 200 ppm or more, in terms of effective dyeing, and included at 1200 ppm or less, preferably 1000 ppm or less, in terms of spinning of the fiber.

Meanwhile, the polyester fiber for a seat belt according to one exemplary embodiment of the invention as described above may be prepared by a method of melt spinning a polyester polymer to produce undrawn yarn, and drawing the undrawn yarn. The specific conditions or way of progress of each step may be directly or indirectly reflected on the physical properties of the polyester fiber, thereby preparing the polyester fiber for a seat belt having the physical properties as described above.

Hereinafter, a method of preparing the polyester fiber will be explained in detail for each step.

The method of preparing the polyester fiber for a seat belt includes melt spinning a polyester polymer having intrinsic viscosity of 0.8 dl/g or more at 270° C. to 310° C. to produce undrawn polyester yarn, and drawing the undrawn polyester yarn.

First, referring to attached drawings, the specific exemplary embodiments of the present invention of melt spinning and drawing processes will be briefly explained so that one of ordinary knowledge in the art may easily practice it.

FIG. 1 is a process chart schematically representing a preparation process of polyester fiber including the melt spinning and drawing processes, according to one exemplary embodiment of the invention. As shown in FIG. 1, according to the method of preparing the polyester fiber for a seat belt, a polyester chip prepared in the manner as described above is melted, the molten polymer spun through a spinneret is cooled with quenching air, an emulsion is provided for undrawn yarn using an emulsion roll 120 (or oil jet), and the emulsion provided for the undrawn yarn is uniformly dispersed on the surface of the yarn with constant air pressure using a pre-interlacer 130. Thereafter, a drawing process is carried out through a multi-stage drawing device 141-146, and finally a yarn is intermingled with constant pressure in a $2^{nd}$ interlacer 150, and wound in a winder 160, thereby producing yarn.

In the preparation method of the present invention, first, a polymer with high viscosity including polyethylene terephthalate is melt spun to prepare undrawn polyester yarn.

At this time, in order to obtain undrawn polyester yarn satisfying a range of low initial modulus and high elongation, it is preferred that the melt spinning process is carried out at a low temperature range, so as to minimize thermal decomposition of the polyester polymer.

Particularly, spinning at a low temperature, for example, 270 to 310° C., preferably 280 to 305° C., more preferably 282 to 300° C., may be carried out so as to minimize degradation of physical properties such as intrinsic viscosity and a CEG content of the high-viscosity polyester polymer according to the process, that is, maintain high intrinsic viscosity and a low CEG content of the polyester polymer. The spinning temperature refers to an extruder temperature, and if the melt spinning process is carried out above 310° C., thermal decomposition of the polyester polymer may be generated in a large amount to reduce intrinsic viscosity, so that a molecular weight reduction and CEG content increase are greater, and surface damage of yarn may result in degradation of overall physical properties, which is not preferable. On the contrary, if the melt spinning process is carried out at less than 270° C., the melting of the polyester polymer may be difficult, and a spinning property may be degraded with N/Z surface cooling. Thus, it is preferred to carry out the melt spinning process within the above temperature range.

It is preferred that the polyester polymer includes polyethylene terephthalate (PET) as a main component. During the manufacturing process of PET, various additives may be added, and in order to secure excellent mechanical properties upon being manufactured into a seat belt, the PET may be included in at least of 70 mol % or more, more preferably 90 mol % or more.

Further, the polyester polymer may include one or more inorganic additives selected from the group consisting of $TiO_2$, $SiO_2$, $BaSO_4$, and the like. The inorganic additive may be included in a content of 100 to 1200 ppm, preferably 200 to 1000 ppm, based on the polyester polymer. It is preferred that the inorganic additive is included at 100 ppm or more, preferably 200 ppm or more, in terms of effective dyeing of the fiber, and included a 1200 ppm or less, preferably 1000 ppm or less, in terms of spinning of the fiber.

As a result of experiments, it was found that as the melt spinning process of PET proceeds in such a low temperature range, a decomposition reaction of the polyester polymer may be minimized to maintain high intrinsic viscosity and secure high molecular weight, thereby obtaining high strength yarn without applying a high draw ratio in a subsequent drawing process, and as a process with a low draw ratio is thus carried out, the modulus may be effectively lowered so as to obtain polyester fiber satisfying the physical properties as described above.

Further, in the melt spinning process, in order to proceed with it under lower spinning tension, that is, to minimize spinning tension, in terms of minimizing decomposition reaction of the polyester polymer, as an example, the melt spinning speed of the polyester polymer may be controlled to a low speed of 300 to 1000 m/min, preferably 350 to 700 m/min.

The undrawn yarn obtained by undergoing such melt spinning process may have intrinsic viscosity of 0.8 dl/g or more, or 0.8 dl/g to 1.2 dl/g, preferably 0.85 dl/g to 1.15 dl/g, more preferably 0.90 dl/g to 1.10 dl/g.

As described above, in order to prepare polyester fiber with high strength and low modulus, it is preferred to use a high viscosity polyester polymer, for example, the polyester polymer having intrinsic viscosity of 0.8 dl/g or more in the preparation process of the undrawn yarn, thereby maximally maintaining such high viscosity range through melt spinning and drawing processes, and exhibiting high strength with a low draw ratio, to effectively lower the modulus.

However, in order to prevent a cut of a molecular chain due to an increase in melting temperature of the polyester polymer, and a pressure increase by a discharge rate in a spinning pack, it is more preferred that the intrinsic viscosity is 2.0 dl/g or less.

In addition, it is preferred that the PET chip is spun through a spinneret designed such that the fineness of a monofilament is in the range of 8.0 DPF or more, or 8.0 to 20 DPF, preferably 8.5 DPF or more, or 8.5 to 18 DPF. That is, in order to reduce the possibility of generating yarn cutting during spinning, and yarn cutting by interference during cooling, it is preferred that the fineness of the monofilament is 8.0 DPF or more, and in order to increase cooling efficiency, it is more preferred that the monofilament has fineness of 20 DPF or less.

Further, after melt spinning the PET, a cooling process is added to prepare the undrawn PET yarn. It is preferred that such cooling process is carried out by adding cooling air at a temperature of 15 to 60° C., and it is also preferred that a cooling air volume is controlled to 0.4 to 1.5 m/s, in each cooling air temperature condition. Thus, the undrawn PET yarn having all the physical properties according to one exemplary embodiment of the invention may be more easily prepared.

Meanwhile, after preparing the undrawn polyester yarn through such spinning process, the undrawn yarn is drawn to prepare drawn yarn. The drawing process may be carried out under the condition of a total draw ratio of 3.0 to 7.0, preferably 4.0 to 6.5. The undrawn polyester yarn is in a state of maintaining high intrinsic viscosity and a low initial modulus by optimizing the melt spinning process. Accordingly, if the drawing process is carried out under a condition of a high draw ratio of more than 7.0, excessive drawing may occur to result in yarn cutting, pilling, and the like in the drawn yarn, and a high fiber orientation degree may cause manufacture of yarn with low elongation and high modulus. Particularly, if the yarn has reduced elongation and increased modulus under such condition of a high draw ratio, a seat belt and the like to which the yarn is applied may have unfavorable abrasion resistance, heat resistant strength retention, and the like. On the contrary, if the drawing process is carried out under a relatively low draw ratio, the fiber orientation degree may be low, and some polyester fiber prepared therefrom may have low strength. However, in terms of physical properties, if the drawing process is carried out under a draw ratio of 4.0 or more, polyester fiber with high strength and low modulus which is suitable for application to a seat belt and the like, for example, can be prepared, and thus it is preferred to carry out the drawing process under a draw ratio condition of 4.0 to 6.0.

In the drawing process, a non-water based emulsion may be adhered to the undrawn yarn to improve physical properties such as softness, impact absorption, and the like, while maintaining a high strength property of yarn. The drawing process may be carried out after passing the undrawn yarn through a godet roller so that an oil pickup amount is 0.35% to 0.70%, preferably 0.40% to 0.65%, more preferably 0.45% to 0.60%. The oil pickup amount should be 0.35% or more, in terms of effectively imparting surface lubricity and abrasion resistance, while improving workability and maintaining high strength upon manufacture of a seat belt. On the contrary, the oil pickup amount should be 0.70% or less, in terms of imparting light weight and softness of a finally manufactured seat belt, thereby minimizing secondary damage caused by the stiffness of the seat belt itself upon an accident. The oil pickup amount refers to an emulsion amount contained in yarn, and may be measured by a Soxhlet method using a solvent.

The non-water based emulsion refers to all ingredients having the effect of maximizing surface lubricity through a physical or chemical bond on a polyester surface. According to a preferred example of the present invention, the non-water based emulsion may include one or more selected from the group consisting of, for example, polydimethylsiloxane, polydibutylsiloxane, polymethylphenylsiloxane, a paraffin-based lubricant, an ester-based lubricant, a nonionic activator, and an anionic activator. Among these ingredients, it is preferred to use the paraffin-based lubricant, in terms of enhancing compatibility with a solvent used in the emulsion.

Further, the drawing process may be carried out at a first draw ratio of 3.5 to 4.5, and a second draw ratio of 0.9 to 1.8. The first draw ratio refers to a spinning speed and may be, for example, a speed ratio between first and second godet rollers, or between first and third godet rollers. The first draw ratio may preferably be 3.8 to 4.2. Further, the second draw ratio may be, for example, a speed ratio between third and fourth godet rollers. The second draw ratio may preferably be 1.1 to 1.6. As described above, in the drawing process of the present invention, it is preferred to maintain the first and second draw ratios in the optimized range, in terms of manufacture of polyester fiber with high strength and high elongation, suitable for application to a seat belt, and the like.

According to another appropriate embodiment of the invention, in order to prepare polyester fiber with a low modulus while simultaneously satisfying the properties of high strength and low shrinkage by a direct spinning drawing process, a polyethylene terephthalate polymer chip with high viscosity is melt-spun, and then, while being passed through a multi-stage godet roller to be wound on a winder, is subjected to drawing heat setting, relaxing, and winding processes.

In the drawing process, the first godet roller may be operated at a temperature of 60 to 100° C. at a speed of 400 to 700 m/min, the second godet roller may be operated at a temperature of 80 to 120° C. at a speed of 400 to 700 m/min, the third godet roller may be operated at a temperature of 100 to 140° C. at a speed of 1800 to 2500 m/min, the fourth godet roller may be operated at a temperature of 160 to 250° C. at a speed of 2800 to 3500 m/min, and the fifth godet roller may be operated at a temperature of 90 to 130° C. at a speed of 2800 to 3500 m/min.

The relaxation rate in the relaxing process is preferably 1% to 14%. In a case of being less than 1%, the shrinkage rate is difficult to exhibit, and fiber with high elongation and low modulus may be difficult to prepare due to formation of a high fiber orientation degree, as in a high draw ratio condition. In a case of being above 14%, vibration of yarn on a godet roller is increased, so that workability may not be secured.

Further, in the drawing process, a heat setting process to heat treat the undrawn yarn at a temperature of about 170 to 250° C. may be additionally carried out. Preferably, for appropriate progress of the drawing process, the heat treatment may be carried out at 175 to 240° C., more preferably 180 to 245° C. If the temperature is less than 170° C., the thermal effect may not be high enough to lower relaxation efficiency and thus shrinkage may not be achieved. On the contrary, if the temperature is higher than 250° C., yarn strength is lowered and the generation of tar on a roller is increased due to thermal decomposition, so that workability is decreased.

Herein, a winding speed may be 2000 to 4000 m/min, preferably 2500 to 3700 m/min.

Meanwhile, as the polyester fiber of the present invention represents high strength, low modulus, and high elongation properties, it may be suitably used in industrial materials for various uses, such as a seat belt, a fiber for rubber reinforcement such as a tire cord, a hose, a tube, and the like, fiber for a fishing net, or the like. Particularly, the present invention provides a seat belt and the like including the polyester fiber.

Particularly, the polyester fiber of the present invention may be used as weft and warp, and subjected to beaming and weaving processes to manufacture a seat belt. The seat belt and the like may be manufactured using a typical narrow width weaving machine, and the weaving machine is not limited to a particular one. However, in a case of weaving in the form of plain weave, a Raier loom, an air jet loom, a water jet loom, or the like may be used.

In the present invention, as described above, by using yarn having optimized intrinsic viscosity, tensile strength, and total fineness at the same time, excellent mechanical properties, abrasion resistance, and strength retention may be secured, even in the state of minimizing the number of woven yarns upon weaving a seat belt.

The polyester seat belt of the present invention may have tensile strength as measured according to the Korean Parts and Materials Reliability Standards RS K 0005: 2007 method (webbing for a vehicle safety belt) of 2950 kgf or more, or 2950 kgf to 3500 kgf, preferably 3000 kgf or more, more preferably 3050 kfg or more. The tensile strength of a seat belt may be 2950 kfg or more, in terms of securing excellent strength to safely support a passenger upon a car accident.

The polyester seat belt may have elongation as measured according to the Korean Parts and Materials Reliability Standards RS K 0005: 2007 method (webbing for a vehicle safety belt) of 8% to 13%, preferably 8.5% to 12.5%, more preferably 9% to 12%. The elongation of a seat belt refers to the elongation at strength of a seat belt of 11.1 kN. The elongation of a seat belt may be 8% or more, in terms of minimizing discomfort, secondary damage, and the like of a passenger, caused by the stiffness of a seat belt itself. Also, the elongation of a seat belt may be 13% or less, in terms of maintaining sufficient recoil distance for passenger protection, and safely supporting a passenger upon a car accident.

The polyester seat belt according to the present invention may be manufactured in a woven density of 280 yarns/inch or less. Particularly, warp density in such woven density may be preferably 230 to 280 yarns/inch, more preferably 240 to 270 yarns/inch. Preferably, the warp density may be 230 yarns/inch or more, in terms of securing excellent strength to safely support a passenger upon a car accident. Also, the warp density may be 280 yarns/inch or less, in terms of preventing excessive increase and optimizing wearing comfort of a passenger. Further, weft density may be 4 to 8 yarns/inch, preferably 4.5 to 7 yarns/inch, more preferably 5 to 6.5 yarns/inch. The weft density may be 4 yarns/inch or more, for efficient drive when taking out and housing the seat belt upon attachment and detachment. Also, the weft density may be 8 yarns/inch or less, in order to not degrade wearing comfort of a passenger due to excessive thickness of a seat belt. Even in such an optimized low woven density range, the polyester seat belt of the present invention may have excellent mechanical properties of high strength, as described above.

The polyester seat belt of the present invention may have strength retention as measured in evaluation of abrasion resistance by hexagonal bars of 85% or more, preferably 90% or more, more preferably 95% or more. In addition, as described above, it may represent excellent abrasion resistance with tensile strength of 2950 kgf or more, thereby minimizing degradation of physical properties even in long-term use, and effectively serving to hold a passenger upon an accident.

Particularly, the seat belt is generally commercialized by performing a dyeing process under a high temperature environment. In this case, in order to match elongation of dyeing paper when using the conventional polyester fiber, shrinkage during dyeing may be 1% to 20% under a high temperature condition of 200 degrees Celsius (° C.) or more. However, in such a case, mechanical properties and the like may be significantly deteriorated as compared with a seat belt grey fabric, due to shrinkage during the dyeing process. Accordingly, the polyester fiber of the present invention may be dyed without shrinkage for matching elongation of dyeing paper during dyeing, but rather with drawing, by its high strength, low modulus, and high elongation properties, so that excellent mechanical properties may be secured. Further, even in a case of carrying out a dyeing process under a high temperature environment, the effect of maintaining or improving the physical properties of dyeing paper with excellent heat resistant strength retention may be obtained.

Meanwhile, the seat belt may have an impact absorption rate of 65% or more, preferably 66% or more, more preferably 67% or more. The impact absorption rate of the seat belt may be measured by an energy absorption range according to the Korean Parts and Materials Reliability Standards RS K 0005: 2007 method (webbing for a vehicle safety belt). As the seat belt of the present invention has an improved impact absorption rate, as compared with the conventional seat belt, an impact on a passenger upon an accident may be minimized, and at the same time, damage by the seat belt itself may be prevented.

The polyester seat belt of the present invention has high strength and high elongation, and may be optimized to have an average thickness of 0.8 to 1.6 mm, preferably 0.9 to 1.5 mm, more preferably 1 to 1.4 mm, as measured according to the Korean Parts and Materials Reliability Standards RS K 0005: 2007 method (webbing for a vehicle safety belt). The thickness of the seat belt may be 0.8 mm or more, in terms of not being rolled at the time of taking out and housing the seat belt upon attachment and detachment. Also, the thickness of the seat belt may be 1.6 mm or less, in terms of not causing discomfort to a passenger with excessive thickness, and intending total weight loss of the vehicle.

Meanwhile, according to another exemplary embodiment of the present invention, a method of manufacturing the seat belt as described above is provided. The method of manufacturing the seat belt is characterized by exhibiting excellent strength even with a small number of yarns, that is, low warp density.

The seat belt of the present invention may be manufactured by using the polyester fiber as described above as weft and warp, and subjecting it to beaming and weaving processes. The seat belt and the like may be manufactured using a typical narrow width weaving machine, and the weaving machine is not limited to a particular one. However, when it is woven in the form of a plain weave, a rapier loom, an air jet loom, a water jet loom, or the like may be used.

Herein, the physical properties of polyester fiber used in the method of manufacturing a seat belt of the present invention, a finally manufactured seat belt, and the like are as described above.

In the present invention, since matters other than the above description may be adjustable as necessary, they are not particularly limited in the present invention.

ADVANTAGEOUS EFFECTS

According to the present invention, polyester fiber for a seat belt with excellent abrasion resistance, strength retention, and the like, together with excellent mechanical properties may be provided, by optimizing intrinsic viscosity, tensile strength, total fineness, and the like to predetermined ranges.

Therefore, such polyester fiber may have a significantly lowered shrinkage and excellent mechanical properties by being optimized to have high strength, low modulus, and high elongation. Simultaneously, it may secure excellent abrasion resistance, strength retention, and impact absorption performance, and thus retain the high strength property so as to support a passenger with sufficient strength upon a car crash, and minimize impact on a passenger to safely protect the passenger.

EXAMPLES

Figure 1:
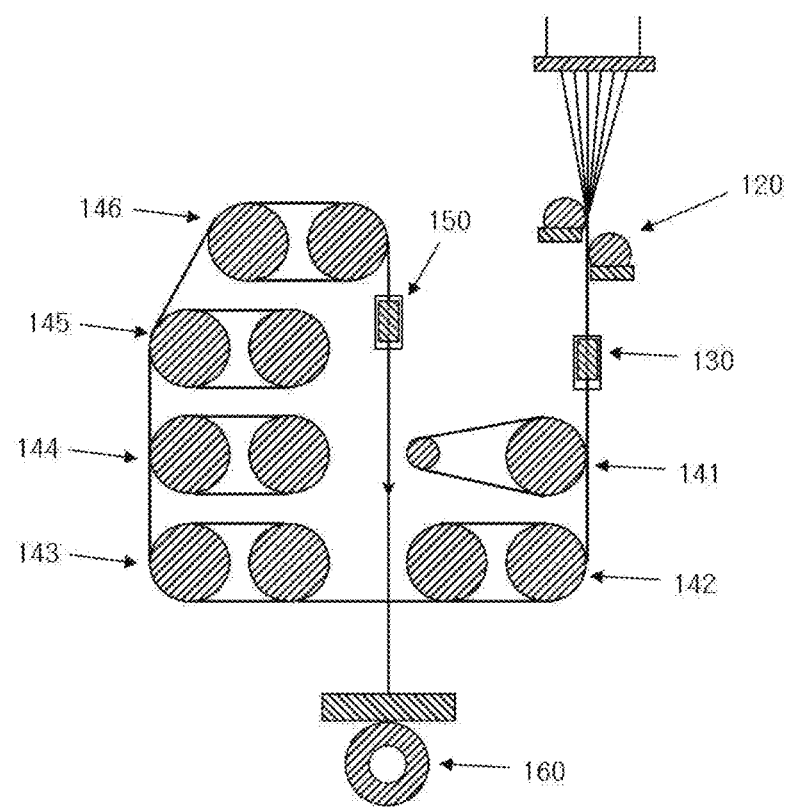
FIG. 1 is a process chart schematically representing a preparation process of polyester fiber for a seat belt, according to one exemplary embodiment of the invention.

Hereinafter, preferred examples are presented in order to help better understanding of the present invention, however the following examples are only illustrative of the present invention, and do not limit the scope of the present invention.

Examples 1-5

After preparing undrawn polyester yarn in a manner of melt spinning and cooling a polyester polymer having predetermined intrinsic viscosity, the undrawn yarn was subjected to heat treatment while being drawn at a predetermined draw ratio, thereby preparing polyester fiber. Herein, the drawing process was carried out after passing the undrawn yarn through a godet roller so that an oil pickup amount was in an optimized range as shown in Table 1 below, using a paraffin-based lubricant.

Meanwhile, the intrinsic viscosity of the polyester polymer, the spinning speed, spinning tension, and spinning temperature condition of the melt spinning process, a draw ratio, and a heat treatment temperature were as shown in Table 1 below, and the remaining conditions followed a general condition for preparing a polyester fiber.

TABLE 1

|  | Example 1 | Example 2 | Example 3 | Example 4 | Example 5 |
|---|---|---|---|---|---|
| Intrinsic viscosity of chip (dl/g) | 0.95 | 0.98 | 1.13 | 1.15 | 1.2 |
| Spinning temperature (° C.) | 285 | 290 | 293 | 295 | 295 |
| Oil pickup amount (%) | 0.7 | 0.6 | 0.5 | 0.4 | 0.3 |
| Total draw ratio | 5.9 | 5.7 | 5.6 | 5.5 | 5.5 |
| First draw ratio | 3.6 | 3.6 | 3.7 | 3.7 | 3.7 |
| Second draw ratio | 1.6 | 1.5 | 1.5 | 1.5 | 1.5 |
| First godet roller temperature (° C.) | 60 | 65 | 70 | 75 | 80 |
| First godet roller speed (m/min) | 500 | 510 | 520 | 530 | 540 |
| Second godet roller temperature (° C.) | 80 | 85 | 90 | 95 | 100 |
| Second godet roller speed (m/min) | 550 | 560 | 570 | 580 | 590 |
| Third godet roller temperature (° C.) | 110 | 115 | 120 | 125 | 130 |
| Third godet roller speed (m/min) | 1800 | 1850 | 1900 | 1950 | 2000 |
| Fourth godet roller temperature (° C.) | 160 | 165 | 170 | 175 | 180 |
| Fourth godet roller speed (m/min) | 2800 | 2850 | 2900 | 2950 | 3000 |
| Heat treatment temperature (° C.) | 240 | 235 | 235 | 235 | 240 |

For the polyester fiber prepared according to Examples 1-5, physical properties were measured by the following methods, and the results are summarized in the following Table 2.

1) Tensile Strength and Elongation at Break

The tensile strength and elongation at break of the polyester yarn were measured using a Universal Testing Machine (Instron), with the length of the sample of 250 mm, tensile speed of 300 mm/min, and an initial load of 0.05 g/d.

Further, in the strength-elongation curve according to tensile strength and elongation measured above, an elongation value (%) corresponding to each tensile strength (0.8 g/d, 5.0 g/d, and 8.8 g/d) was confirmed, and also maximum strength (g/d) and elongation (%) of the yarn at maximum strength point were confirmed.

2) Initial Modulus

Modulus (Young's modulus), and strength and elongation, were measured by a method according to the American Society for Testing and Materials ASTM D 885 method, and each modulus at 1% and 2% elongation, that is, at the point of being stretched by 1% and 2%, are shown in the following Table 2.

3) Dry Heat Shrinkage

The measurement of dry heat shrinkage was carried out after maintaining the fiber in an oven at 150° C. for 30 minutes.

4) Crystallinity

The density ρ of the polyester fiber was measured at 25° C. according to a density gradient column method using n-heptane and carbon tetrachloride. Then, the crystallinity was calculated according to the following Calculation Formula 1.

$$X_c(\text{Crystallinity}) = \frac{\rho_c(\rho - \rho_a)}{\rho(\rho_c - \rho_a)}$$ [Calculation Formula 1]

wherein ρ is the density of the fiber, $\rho_c$ is the density of a crystal for the fiber ($\rho_c$=1.457 g/cm³ for PET), and $\rho_a$ is the density of amorphism for the fiber ($\rho_a$=1.336 g/cm³ for PET).

5) Intrinsic Viscosity

First, an emulsion was extracted from the fiber sample using carbon tetrachloride and dissolved in OCP (ortho-chlorophenol) at 160±2° C. Then, the viscosity of the fiber sample was measured from the OCP solution in a viscosity tube using an automatic viscometer (Skyvis-4000) under the condition of 25° C. The intrinsic viscosity (IV) of the polyester fiber was calculated according to the following Calculation Formula 2.

Intrinsic viscosity (IV)={(0.0242×Rel)+ 0.2634}×F  [Calculation Formula 2]

wherein $$Rel = \frac{\text{seconds of solution} \times \text{specific gravity of solution} \times \text{viscosity coefficient}}{OCP \text{ viscosity}},$$

and $$F = \frac{IV \text{ of standard chip}}{\text{average of three } IV\text{'s measured from standard chip with standard action}}.$$

6) Total Fineness and Single Yarn Fineness

Total fineness of the fiber was measured by taking 9000 m of yarn using a reel, and weighing the yarn (denier). Then, single yarn fineness was calculated by dividing the total fineness by the number of filaments, as denier per filament.

TABLE 2

|  | Crystallinity (%) | Intrinsic viscosity of yarn (dl/g) | Initial modulus (g/d) | Tensile strength (g/d) | Elongation at break (%) | Dry heat shrinkage (%) | Single yarn fineness (DPF) | Total fineness (de) |
|---|---|---|---|---|---|---|---|---|
| Example 1 | 48.2 | 0.94 | 92 | 9.8 | 14 | 9.3 | 10.21 | 1500 |
| Example 2 | 47.3 | 0.95 | 89 | 9.8 | 15 | 9.5 | 10.23 | 1500 |
| Example 3 | 47.4 | 0.93 | 78 | 9.9 | 14 | 10.3 | 10.11 | 1500 |
| Example 4 | 48.5 | 0.96 | 74 | 9.8 | 13 | 10.6 | 10.31 | 1500 |
| Example 5 | 47.8 | 1.0 | 65 | 9.9 | 14 | 10.5 | 10.52 | 1500 |

Comparative Examples 1-5

Polyester fiber of Comparative Examples 1-5 was prepared in the same manner as Examples 1-5, except for the conditions described in the following Table 3.

TABLE 3

|  | Comparative Example 1 | Comparative Example 2 | Comparative Example 3 | Comparative Example 4 | Comparative Example 5 |
| --- | --- | --- | --- | --- | --- |
| Intrinsic viscosity of chip (dl/g) | 0.80 | 0.85 | 0.90 | 0.93 | 0.97 |
| Spinning temperature (° C.) | 311 | 312 | 313 | 314 | 315 |
| Oil pickup amount (%) | 0.75 | 0.75 | 0.8 | 0.8 | 0.75 |
| Total draw ratio | 6.02 | 6.01 | 5.94 | 5.92 | 5.86 |
| First draw ratio | 3.6 | 3.6 | 3.7 | 3.7 | 3.7 |
| Second draw ratio | 1.6 | 1.5 | 1.5 | 1.5 | 1.5 |
| First godet roller temperature (° C.) | 60 | 65 | 70 | 75 | 80 |
| First godet roller speed (m/min) | 500 | 510 | 520 | 530 | 540 |
| Second godet roller temperature (° C.) | 80 | 85 | 90 | 95 | 100 |
| Second godet roller speed (m/min) | 550 | 560 | 570 | 580 | 590 |
| Third godet roller temperature (° C.) | 110 | 115 | 120 | 125 | 130 |
| Third godet roller speed (m/min) | 1800 | 1850 | 1900 | 1950 | 2000 |
| Fourth godet roller temperature (° C.) | 160 | 165 | 170 | 175 | 180 |
| Fourth godet roller speed (m/min) | 2800 | 2850 | 2900 | 2950 | 3000 |
| Heat treatment temperature (° C.) | 220 | 220 | 220 | 210 | 210 |

For the polyester fiber prepared according to Comparative Examples 1-5, physical properties were measured by the above-described method, and the results are summarized in the following Table 4.

TABLE 4

|  | Crystallinity (%) | Intrinsic viscosity of yarn (dl/g) | Initial modulus (g/d) | Tensile strength (g/d) | Elongation at break (%) | Dry heat shrinkage (%) | Single yarn fineness (DPF) | Total fineness (de) |
| --- | --- | --- | --- | --- | --- | --- | --- | --- |
| Comparative Example 1 | 42.2 | 0.60 | 111 | 9.0 | 12 | 9.4 | 12.3 | 1500 |
| Comparative Example 2 | 42.8 | 0.65 | 106 | 9.5 | 12 | 9.1 | 12.4 | 1500 |
| Comparative Example 3 | 42.3 | 0.70 | 104 | 9.3 | 13 | 9.2 | 12.4 | 1500 |
| Comparative Example 4 | 42.1 | 0.75 | 102 | 9.2 | 13 | 9.4 | 12.3 | 1500 |
| Comparative Example 5 | 42.1 | 0.78 | 100 | 9.3 | 13 | 9.3 | 12.2 | 1500 |

Preparation Example

A webbing having warp density of 250 yarns/inch and weft density of 5.65 yarns/inch as woven density was manufactured through a narrow width weaving machine using the polyester fiber prepared according to Examples 1-5 and Comparative Examples 1-5. The webbing was subjected to a dyeing process to manufacture a specimen of a seat belt, and the physical properties were measured by the following method.

a) Average Thickness of a Seat Belt

The average thickness of a seat belt was measured by the method according to the Korean Parts and Materials Reliability Standards RS K 0005: 2007 method (webbing for a vehicle safety belt).

b) Tensile Strength of a Seat Belt

The tensile strength of a seat belt was measured by the method according to the Korean Parts and Materials Reliability Standards RS K 0005: 2007 method (webbing for a vehicle safety belt).

c) Elongation of a Seat Belt

The elongation of a seat belt was measured by the method according to the Korean Parts and Materials Reliability Standards RS K 0005: 2007 method (webbing for a vehicle safety belt).

d) Evaluation of Energy Absorption Rate

The energy absorption rate of the seat belt specimen, that is, the work ratio, was measured and evaluated by the following method.

Figure 2:
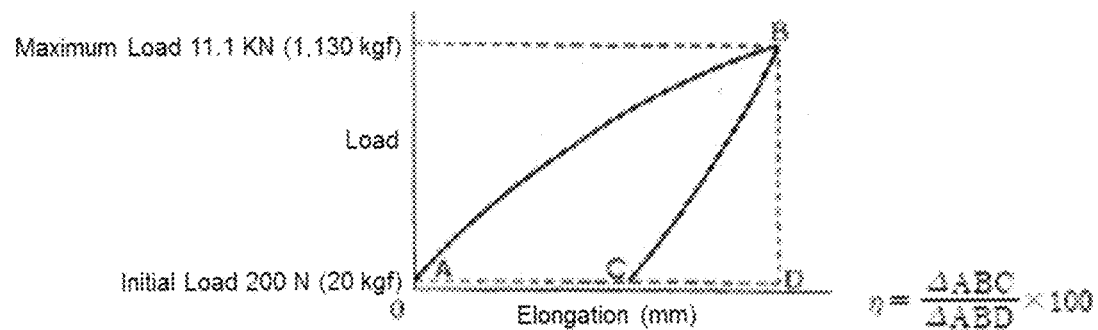
FIG. 2 shows an example of a load-elongation curve for calculating impact energy absorption on a seat belt including the polyester fiber according to one exemplary embodiment of the invention.

First, an energy absorption rate test was carried out by applying a tensile load by an elongation measurement method, when the load reached 11.1 kN, removing the load immediately at the same speed as the tension, and recovering the load to initial load, thereby obtaining a load-elongation curve as shown in FIG. 2. Work area (ΔABD) was measured from the area produced below the curve AB under the tensile load from the initial load to the maximum load. The work area (ΔABC) was measured from the area surrounded by the curve AB under the tensile load and the curve BC upon removal of the load. The energy absorption rate, that is, the work ratio, was calculated according to the following Calculation Formula 3.

Work ratio=(ΔABC/ΔABD)×100    [Calculation Formula 3]

e) Evaluation of Abrasion Resistance by Hexagonal Bar

Abrasion resistance of the seat belt specimen by a hexagonal bar was measured by the following method.

Figure 3:
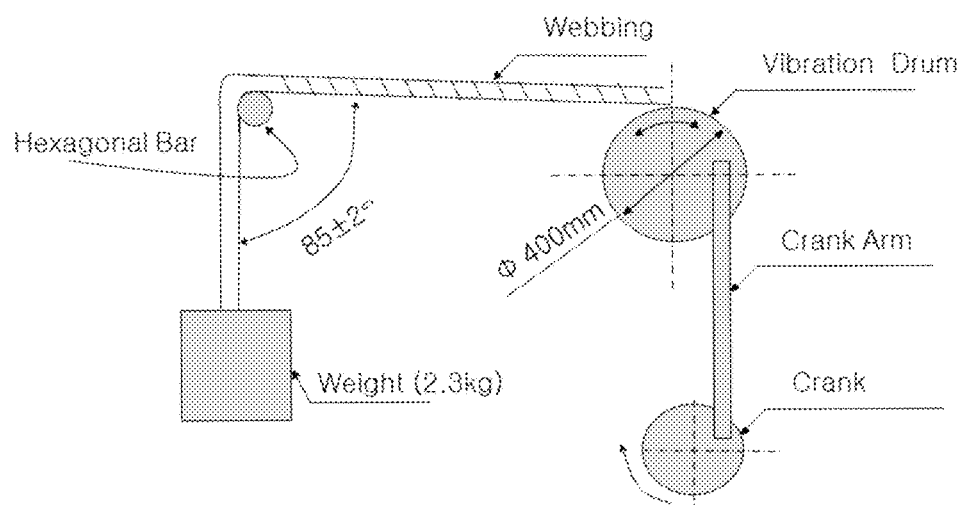
FIG. 3 is a schematic diagram of a device used for evaluation of abrasion resistance of a seat belt including the polyester fiber according to one exemplary embodiment of the invention by a hexagonal bar.

First, the seat belt specimen (webbing) was attached to the testing device of FIG. 3, a weight of 2.35±0.05 kg was suspended on one end of the specimen, and the other end was fixed to a vibration drum (diameter of 400 mm) across the hexagonal bar. The drum was driven through a crank arm, a crank, and the like. The specimen was rubbed back and forth 2500 times at two angles of the hexagonal bar at 30±1 times every minute and a distance of 330±30 mm, and then strength retention and tensile strength of the specimen were measured using the Universal Testing Machine (Instron). Herein, the angle of the hexagonal bar used once was not used again as it was.

Particularly, the strength retention of the seat belt specimen was measured by the method according to the American Society for Testing and Materials ASTM D 2256 method. The tensile strength of the specimen was obtained by leaving the specimen at a temperature of 20±2° C. and relative humidity of 65±2% for 24 hours, carrying out installation so that the distance between two clamps was 200±20 mm, applying a load so that tensile speed was 100 mm per minute, and pulling the specimen until being broken, thereby measuring tensile strength at break.

The measurement results of the physical properties of the seat belts manufactured using the polyester fiber prepared according to Examples 1-5 and Comparative Examples 1-5 are shown in the following Table 5.

As shown in the above Table 5, the seat belts manufactured from the polyester fiber having high intrinsic viscosity and elongation, low initial modulus, and the like according to Examples 1-5 had strength retention after evaluation of abrasion resistance of 95.1% to 95.8%, and tensile strength of 2870 to 2887 kgf, and thus had excellent properties. At the same time, the seat belts manufactured from the polyester fiber of Examples 1-5 had impact absorption rates of 68% to 72%, which is the property of an excellent seat belt. Thus, it is appreciated that it had excellent impact resistance absorption, strength retention, and the like. Further, though the seat belts from the polyester fiber of Examples 1-5 were weight lightened to an average thickness of 1.3 mm to 1.4 mm, their strength retention was 3005 kgf to 3030 kgf, and thus it is appreciated that they had excellent properties.

On the contrary, it is appreciated that the seat belts manufactured using the polyester fiber of Comparative Examples 1-5 did not satisfy such properties. Particularly, the seat belts manufactured with the polyester fiber of Comparative Examples 1-5 had strength retention after evaluation of abrasion resistance of only 78.2% to 81.5%, and significantly low tensile strength of 2337 to 2432 kgf. At the same time, it is appreciated that the seat belts from the polyester fiber of Comparative Examples 1-5 had significantly low impact absorption rates of 58% to 62%, and in such case, such low impact absorption rate may cause injury to a passenger upon an accident. As described above, the seat belts of Comparative Examples 1-5 had significantly low strength retention, and thus, upon a long-term use, physical properties may be rapidly degraded to the state where a passenger may not be protected upon an accident. Further, though the seat belts from the polyester fiber of Comparative Examples 1-5 were thicker, having an average thickness of 1.5 mm to 1.6 mm, they had strength of 2980 kgf to 2996 kgf, which is significantly lower than that of Examples 1-5.

The invention claimed is:
1. A method of preparing a polyester fiber for a seat belt:
melt spinning a polyester polymer having intrinsic viscosity of 0.8 dl/g or more at 270 to 310° C. to produce undrawn polyester yarn; and
drawing the undrawn polyester yarn;
wherein the drawing process is carried out after passing the undrawn yarn through a godet roller so that an oil pickup amount is 0.3% to 0.7%;

TABLE 5

|  | Average thickness (mm) | Tensile strength (kgf) | Elongation (%) | Impact absorption rate/work ratio (%) | Evaluation of abrasion resistance | |
| --- | --- | --- | --- | --- | --- | --- |
|  |  |  |  |  | Strength retention | Tensile strength (kgf) |
| Example 1 | 1.3 | 3005 | 15.8 | 70 | 95.1 | 2858 |
| Example 2 | 1.4 | 3012 | 16.2 | 68 | 95.3 | 2870 |
| Example 3 | 1.3 | 3030 | 16.3 | 70 | 95.3 | 2887 |
| Example 4 | 1.3 | 3008 | 16.1 | 71 | 95.6 | 2877 |
| Example 5 | 1.4 | 3015 | 15.9 | 72 | 95.8 | 2887 |
| Comparative Example 1 | 1.5 | 2989 | 14.2 | 62 | 78.2 | 2337 |
| Comparative Example 2 | 1.6 | 2980 | 14.3 | 58 | 79.8 | 2378 |
| Comparative Example 3 | 1.5 | 2996 | 14.2 | 61 | 80.5 | 2413 |
| Comparative Example 4 | 1.5 | 2988 | 14.5 | 62 | 79.8 | 2385 |
| Comparative Example 5 | 1.6 | 2984 | 14.3 | 60 | 81.5 | 2432 | a first draw ratio is 3.5 to 4.5 and a second draw ratio is 0.9 to 1.8 in the drawing process; and a first godet roller is operated at a temperature of 60 to 80° C. at a speed of 500 to 540 m/min, a second godet roller is operated at a temperature of 80 to 100° C. at a speed of 550 to 590 m/min, a third godet roller is operated at a temperature of 110 to 130° C. at a speed of 1800 to 2000 m/min, and a fourth godet roller is operated at a temperature of 160 to 180° C. at a speed of 2800 to 3000 m/min, in the drawing process.

2. The method according to claim 1, wherein the oil pickup amount is 0.35% to 0.7%.

* * * * *